C. BARNARD.
DRIER.
APPLICATION FILED MAY 2, 1913.
1,073,729.
Patented Sept. 23, 1913.
2 SHEETS—SHEET 1.
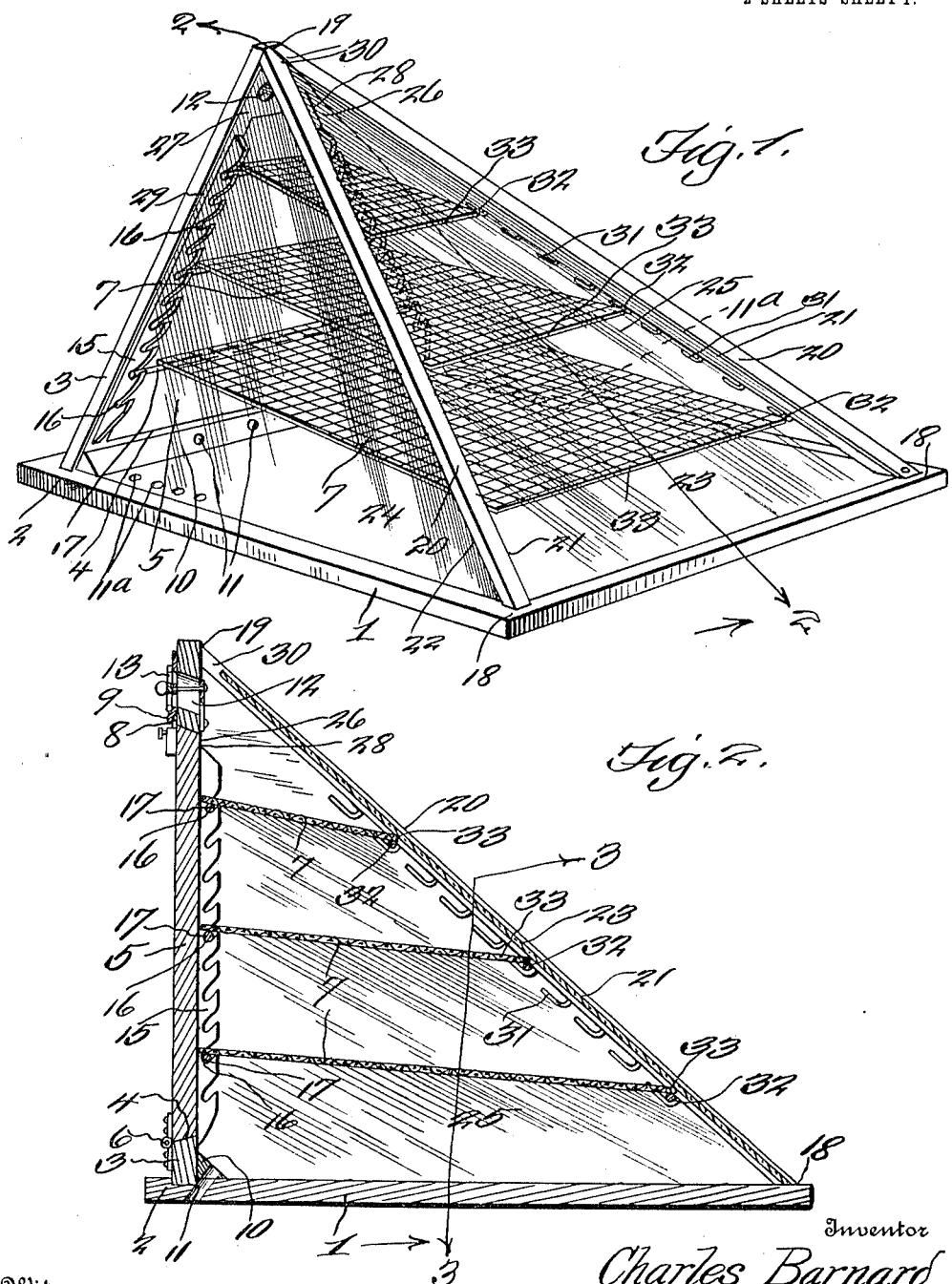
Witnesses
Mark DeGrange
Inventor
Charles Barnard,
By D. Swift & Co.,
his Attorneys C. BARNARD.
DRIER.
APPLICATION FILED MAY 2, 1913.
1,073,729.
Patented Sept. 23, 1913.
2 SHEETS—SHEET 2.
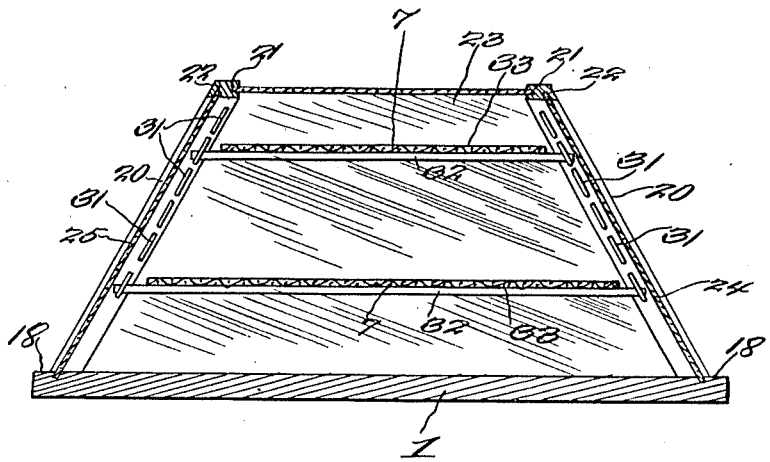
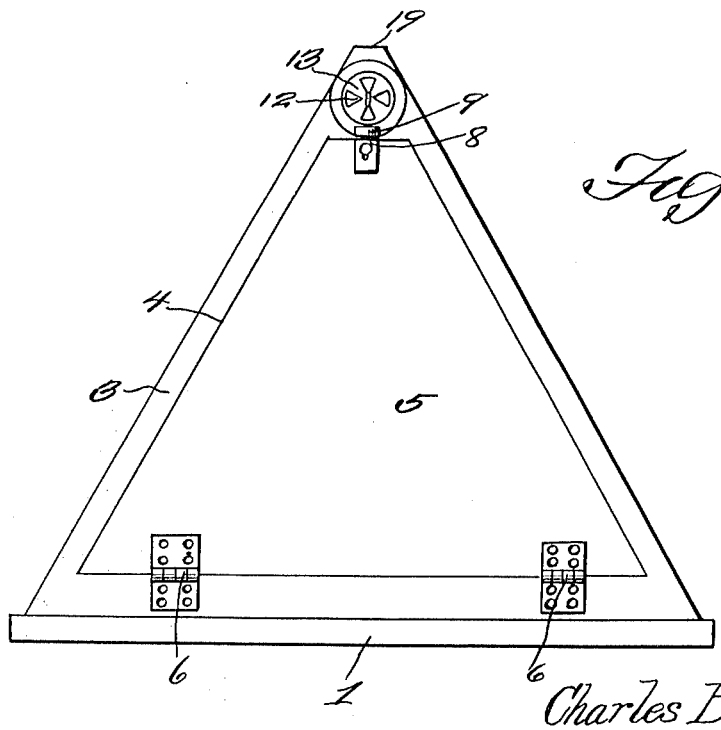
Witnesses
Mark DeGrange.
Francis T. Boxwell.
Inventor
Charles Barnard
By D. Swift & Co.,
Attorneys

UNITED STATES PATENT OFFICE.

CHARLES BARNARD, OF PASADENA, CALIFORNIA, ASSIGNOR TO E. E. DOW, OF REDLANDS, CALIFORNIA.

DRIER.

1,073,729.

Specification of Letters Patent.

Patented Sept. 23, 1913.

Application filed May 2, 1913. Serial No. 765,121.

*To all whom it may concern:*

Be it known that I, CHARLES BARNARD, a citizen of the United States, residing at Pasadena, in the county of Los Angeles and State of California, have invented a new and useful Drier; and I do hereby declare the following to be a full, clear, and exact description of the invention, such as will enable others skilled in the art to which it appertains to make and use the same.

This invention relates to a new and useful drier or appliance for the efficient and hygienic evaporating of the moisture of herbs, fruit, vegetables, fish, meats and other foods, to cure and preserve them in a permanent form suitable for cooking or eating raw.

It is an object of the invention to provide an inclosure of such a construction and shape, so that it may be placed in a true north and south position, thus making it possible so that each glass prism of the structure will receive the sun's rays from the time of the rising of the sun to the setting of the sun and through every hour of the day, as well as every day in the year and in all latitudes. The continual playing of the sun's rays upon the glass closure creates the necessary heat therein, for efficiently and in a hygienic manner evaporating the moisture from the fruits, vegetables and the like, there being suitable inlet and outlet vents, whereby the current of hot air induced by its expansion by the heat of the sun may be controlled, in order to regulate the temperature, to suit the drying conditions of different kinds of foods. In this manner the outflow or removal of the air laden with moisture may be regulated by means of a slide or damper in the outlet opening, the fresh air which is drawn in at the bottom acts to absorb continuously the moisture of the foods and to convey it away through the outlet.

With this improved device, it is possible to dry all kinds of foods under temperature conditions, which will prevent the growth of mold or bacterial life, and at the same time exclude wind, dust, rain and every form of insect life.

In practical fields it may be found necessary to subject the various details of construction to alterations, to which the patentee is entitled, provided the alterations fall within the scope of what is claimed.

The invention comprises further features and combination of parts, as hereinafter set forth, shown in the drawings and claimed.

In the drawings:—Figure 1 is a view in perspective showing the improved drier constructed in accordance with the invention. Fig. 2 is a sectional view on line 2—2 of Fig. 1. Fig. 3 is a sectional view on line 3—3 of Fig. 2. Fig. 4 is a rear view.

Referring more particularly to the drawings, 1 designates the base of the structure, which may be constructed of any suitable material and any suitable area. In the present instance, however, it has been found convenient as well as practical to construct the base rectangular in contour. Rising from one of the edge portions 2 of the base is a back plate or board 3, which faces north, that is, when the drier or apparatus is in use. This back 3, it will be observed, is triangular in contour, and is provided with a correspondingly shaped opening 4, provided with a door 5 hinged at 6. By means of this door ready access to the interior of the drier may be had, in order to place and remove the trays 7. The upper end or portion of the door 5 is provided with a latch or bolt 8 to enter the keeper 9, for holding the door closed against falling open. Arranged adjacent the lower portion of the back 3 and in contact with the base is a triangular shaped piece 10, through which and the base openings 11 are provided. These openings 11 allow the inlet of fresh air into the interior of the drier. Above the door the back 3 is constructed with an opening 12, provided with a slide or damper 13, in order to control the outlet or exhaust of air laden with moisture, so as to regulate the temperature upon the interior of the drier. Fixed at 14 to the interior face of the back and arranged correspondingly with the contour of the same are strips 15, one upon each side. These strips 15 are constructed with registering notches or bearings 16, in which rods 17 are arranged, for the support for the mesh or open work trays 7.

Extending from the corners 18 of the base and converging together toward and secured to the back 3 adjacent its apex, as at 19 are bars 20, which may be constructed in any suitable manner and of any suitable material, for instance, metal or wood. These bars are provided with slots 21 and 22. The slots 21 receive the edges of a triangular shaped piece of glass 23, while the slots 22 receive the edges of the triangular shaped pieces of glass 24 and 25. The edges 26 and 27 of the pieces of glass 24 enter the grooves 28 and 29 of the back 3, in this manner a half section of a true pyramid is provided. The adjacent ends 30 of the bars 20 are secured to the back 3, which together with the back secured to the base and the lower forward ends likewise secured to the base, a rigid structure is afforded. Forming a part of or fixed to the bars 20 are hooks 31 to receive the rods 32, which are designed for supporting the ends 33 of the mesh work trays 7.

In using the drier, the same is placed out in the open upon trestles or the like, so that the inlet vents will allow fresh air to enter the interior of the structure. The mesh work trays with fruit, vegetables or like food thereon are placed in the structure resting upon the rods 17 and 32, and then the damper or slide can be operated as desired.

From the foregoing it is apparent that there has been provided a simple and efficient apparatus of a contour corresponding to a half section of a true pyramid having glass top and sides, upon which the sun's rays play from the time of the rising of the sun to the setting of the same, owing to the fact that the back 3 always faces north, for effectually drying various foods, and one which has been found practical, owing to its particular construction.

The invention having been set forth, what is claimed as new and useful is:—

1. In a drier, a base, a back rising therefrom triangular in rear view, sash bars extending from the forward corners of the base and converging toward and secured to the apex of the back, said bars having grooves, said back having grooves disposed to correspond with the shape of the back, triangular pieces of glass arranged in the grooves of the back and the sash bars, and means on the interior of the structure for the support of drying trays.

2. In a drier, a rectangular base, a back triangular in rear view rising from one edge of the base and provided with grooves running parallel with the inclined edges thereof, sash bars having grooves extending from the forward corners of the base extending rearwardly and converging toward and secured to the apex of the back, pieces of glass secured in the grooves, thereby forming substantially a half section of a true pyramid, means for supporting drying trays on the interior of the structure, the base having inlet vents, while the back near its apex is provided with a damper controlled outlet vent.

3. In a drier, a rectangular base, a back triangular to rear view rising from one edge of the base and provided with grooves running parallel with the inclined edges thereof, sash bars having grooves extending from the forward corners of the base extending rearwardly and converging toward and secured to the apex of the back, pieces of glass secured in the grooves, thereby forming substantially a half section of a true pyramid, said back having notched strips, rods arranged in the notches, the sash bars having hooks, rods arranged in the hooks, said rods adapted to support drying trays, the base having inlet vents, while the back near its apex is provided with a damper controlled outlet vent.

In testimony whereof I have signed my name to this specification in the presence of two subscribing witnesses.

CHARLES BARNARD.

Witnesses:
V. M. MORGAN,
J. H. BOOGE.

---

Copies of this patent may be obtained for five cents each, by addressing the "Commissioner of Patents, Washington, D. C."